Oct. 27, 1953

L. KASEHAGEN 2,656,895

CONTINUOUS SEPARATOR

Filed June 17, 1948

Leo Kasehagen,
INVENTOR.

BY Robert J Mawhinney
ATTORNEY

Oct. 27, 1953  L. KASEHAGEN  2,656,895
CONTINUOUS SEPARATOR

Filed June 17, 1948  3 Sheets-Sheet 3

Leo Kasehagen,
INVENTOR.

BY Robert J. Mawhinney
ATTORNEY

Patented Oct. 27, 1953

2,656,895

UNITED STATES PATENT OFFICE 2,656,895

CONTINUOUS SEPARATOR

Leo Kasehagen, West Chester, Pa., assignor to Atlas Powder Company, Wilmington, Del., a corporation of Delaware Application June 17, 1948, Serial No. 33,559

2 Claims. (Cl. 183—2.7)

The present invention relates to a continuous separator.

An object of the invention is to provide an improved device for continuously separating a gas and a slurry of solid material in a liquid occurring in admixture.

A more specific object is to provide an improved device for continuously separating hydrogen gas and a slurry of supported hydrogenation catalyst in a polyhydric alcohol solution occurring in admixture as the reaction mixture leaving a high pressure continuous sugar hydrogenation system.

A further object is to provide a continuous separator of the class referred to which embodies improved slurry level regulating and slurry discharging elements.

A still further object is to provide a continuous separator of the class referred to which embodies improved slurry level indicating means.

The above and other objects will become apparent in the course of the following description.

In the drawings, wherein like numerals refer to corresponding parts,

Figure 1:
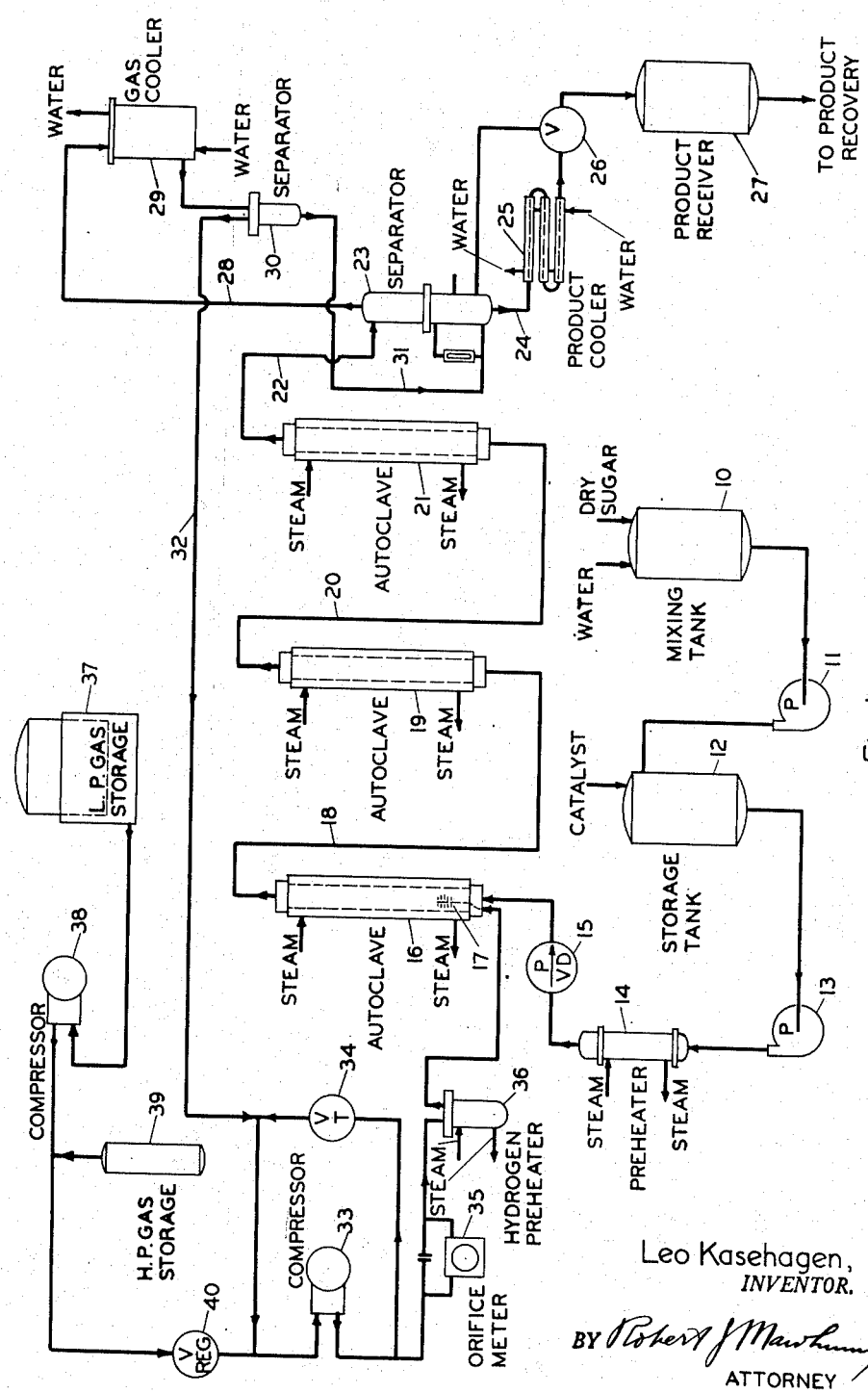
Figure 1 is a flow sheet of a continuous sugar hydrogenating plant illustrating diagrammatically the continuous separator and allied equipment.

Referring now to Figure 1, a dry reducible sugar, such as glucose, and water are introduced into the mixing tank 10 in proportions to prepare a solution of predetermined concentration, for example 50%. Pump 11 advances the sugar solution from mixing tank 10 to the storage tank 12 where a selected proportion of hydrogenating catalyst is added. The tanks 10 and 12 are both conventional process tanks provided with agitators to keep the contents homogeneous. The catalyst preferred for sugar hydrogenation is a conventional reduced nickel catalyst supported on diatomaceous earth. When mixed with the sugar solution in tank 12 the catalyst is suspended, forming a slurry.

The slurry of catalyst in sugar solution is pumped by the pump 13 through a preheater 14, to warm the slurry, and into the variable delivery pump 15 which feeds the slurry into the bottom of a first autoclave 16 at a selected rate. The autoclave 16 and succeeding autoclaves are maintained at a hydrogenating temperature, 150 to 165° C. for producing sorbitol from glucose, by steam jacketing or other conventional heating means.

Hydrogen for the process is introduced into the lower part of the autoclave 16 at hydrogenating pressure, suitably from 1000 to 2000 pounds per square inch gauge, from a circulating system to be described hereinafter. The hydrogen is preferably introduced through a perforated nozzle 17 (shown in dotted line). The charge of slurry and hydrogen pass upwardly through the autoclave 16, and pass out at the upper end thereof through a pipe 18 and into the lower part of the second heated autoclave 19. Passing upwardly through the autoclave 19 the charge leaves through the pipe 20 and enters the lower part of the third heated autoclave 21. Three autoclaves are illustrated but it will be understood that for the purposes of the invention one or any larger number of autoclaves can be employed.

From the top of the third autoclave 21 the reaction mixture, which at this time consists of unreacted hydrogen gas and a slurry of spent catalyst in the solution of polyhydric alcohol, here sorbitol, in water passes through a pipe 22 to the separator designated generally by the numeral 23. In the separator 23 the reaction mixture is continuously separated into fractions consisting respectively of the hydrogen gas and the slurry. The slurry leaves the bottom of the separator 23 through the discharge line 24, passes through the product cooler 25, discharge and pressure reducing valve 26 and into the product receiver 27. The cooled slurry, at atmospheric pressure, is withdrawn from time to time from the receiver 27 and treated by conventional product recovery steps including filtration to remove the spent catalyst.

Hydrogen gas leaves the separator through the line 28 and passes to a condenser consisting of a gas cooler 29 and a solvent separator 30 for the purpose of condensing and removing sugar solvent, here water, from the hot hydrogen gas. Condensed solvent leaves the separator 30 through the solvent return line 31 which enters the lower portion of the separator 23. Hydrogen gas leaves the solvent separator 30 by the line 32 connected to the low pressure side of the circulating compressor 33. The circulating compressor, in the illustrated form of the apparatus, runs at constant speed and is provided with a by-pass controlled by the throttle valve 34 for the purpose of permitting the maintenance of a selected rate of flow into the reactors. Hydrogen from the compressor 33 passes through an orifice flow meter 35 and preheater 36 and so into the first autoclave 16 through the nozzle 17. The throttle valve 34 can be controlled either manually, or automatically by conventional means, to maintain the selected rate of flow in accordance with the measurements of the meter 35.

Hydrogen is initially introduced into the system, and make-up hydrogen periodically added to the system, from the low pressure gas storage tank 37, compressor 38, high pressure gas storage bottle 39, and regulating valve 40. When the system reaches its normal operating state replacing that chemically reacted with hydrogen replacing the sugar and any process losses is automatically introduced from the high pressure storage bottle 39 by the operation of the regulating valve 40 which is set to admit hydrogen to the circulating system to maintain the selected gas pressure.

In the system illustrated, the rate of feed of the sugar and catalyst slurry can be varied by adjustment of the variable delivery pump 15. The rate of hydrogen feed can also be varied by the setting of the throttle valve 34.

In the operation of the hydrogenation plant illustrated in Figure 1 a large excess of hydrogen is employed over the amount required to combine chemically with the sugar. The amount of the excess for preferred operation is described and claimed in my copending application, Serial No. 32,845, filed June 14, 1948. The apparatus which is the subject matter of the instant application is particularly useful for the preferred operation, but is not limited to use therewith.

The reacton mixture leaving the last autoclave 21 is at reaction pressure and this pressure must be maintained on the free hydrogen so that it can be recycled through the system. The slurry must be removed from the system continuously and dropped down to atmospheric pressure for working up to the final product. Several problems arise in separating and discharging this slurry due to its physical nature, the pressure involved, and the continuous manner in which it is delivered for discharge. A body of the slurry must be maintained as a pressure seal in the separator 23 and the discharge line 24. On the other hand, the slurry must be discharged as rapidly as it arrives to prevent fouling of the hydrogen recycling system and the destruction of the circulating compressor 33 and allied equipment. The slurry contains the relatively heavy catalyst in suspension and requires special provisions for preventing settling of the catalyst and for indicating and regulating the slurry level in the separator 23.

Figure 2:
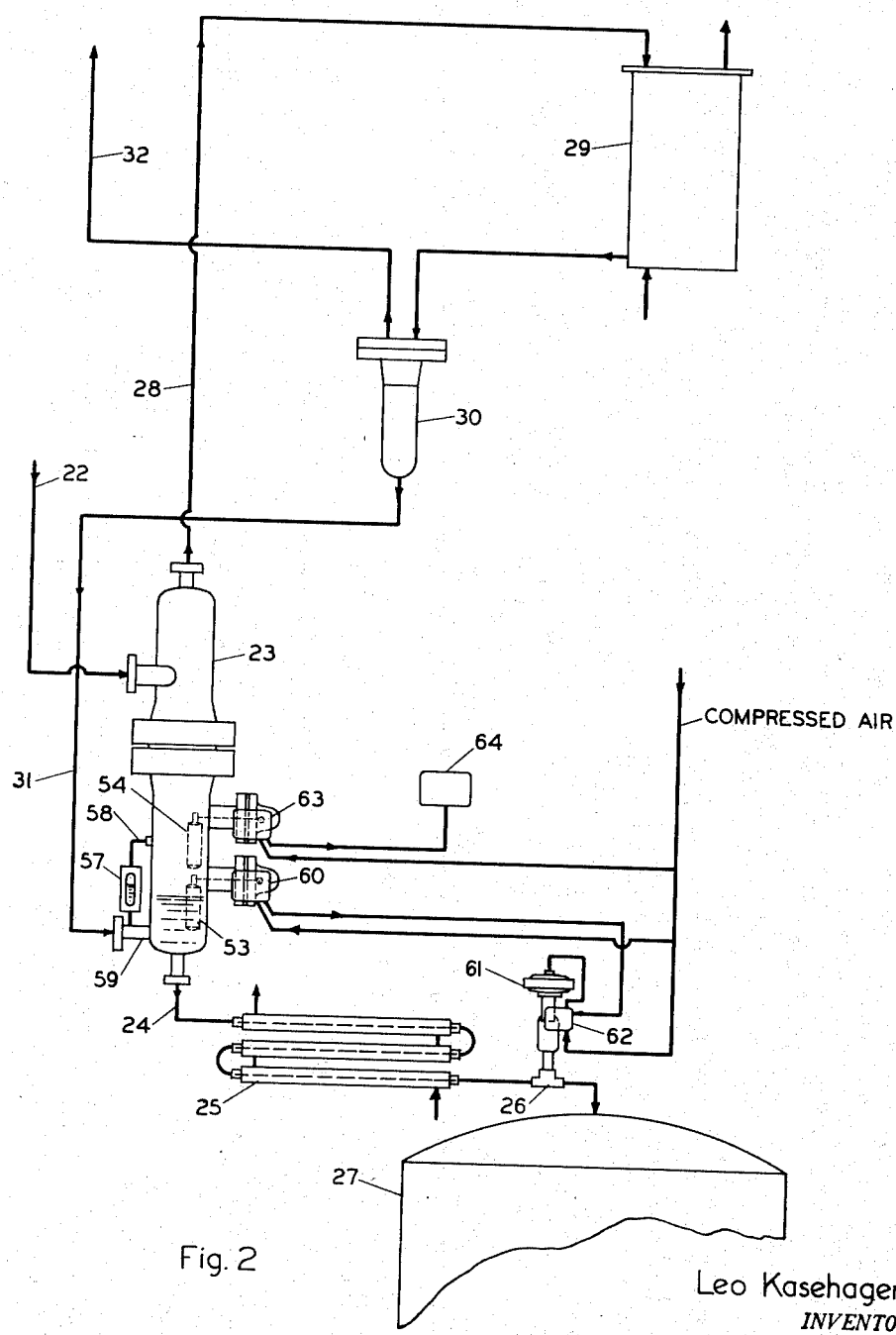
Figure 2 is an enlarged and more detailed diagrammatic illustration of the continuous separator and allied equipment.
Figure 3:
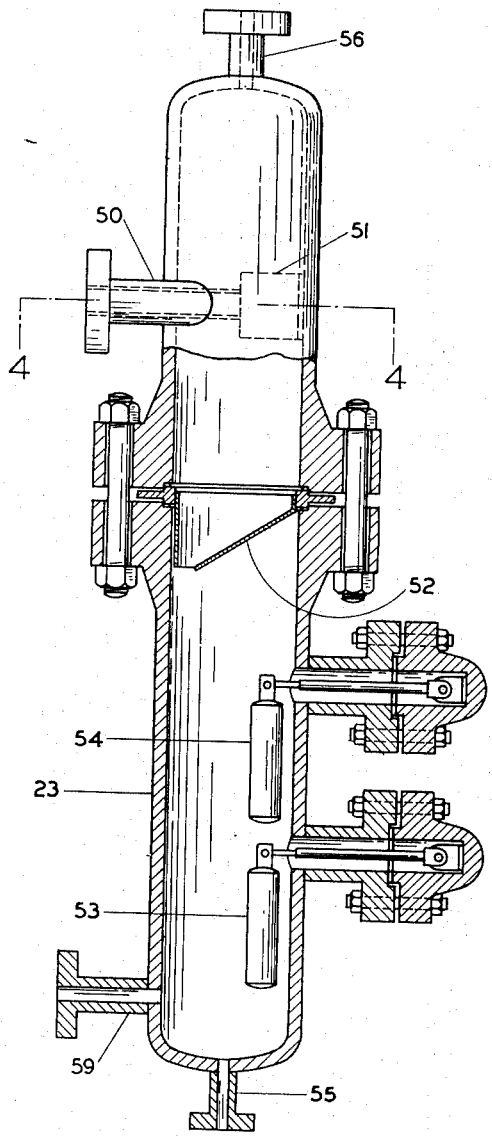
Figure 3 is a vertical cross section of the separator vessel.
Figure 4:
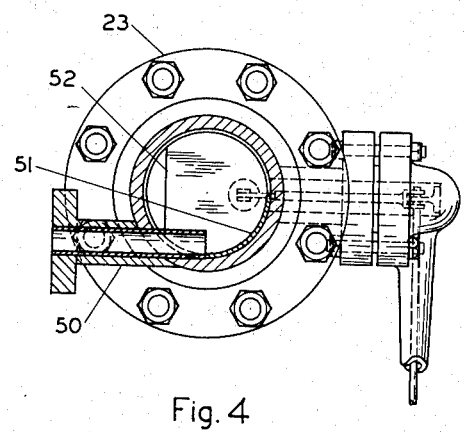
Figure 4 is a horizontal section through the separator taken on the line 4—4 of Figure 3.

Referring now to Figures 3 and 4, the separator 23 is a vertically disposed elongated vessel with a horizontal cross section relatively small with respect to its capacity. The upper end of the vessel provides a hydrogen gas receiving portion and the lower end provides a slurry receiving portion. Reaction mixture from the line 22 enters the separator 23 through the tangential nozzle 50 in the upper part of the vessel impinging against a wier plate 51 and receiving a swirling motion. The slurry then falls to the lower end of the separator 23 striking the baffle 52 which directs the flow away from the level indicating floats 53 and 54. The inside dimensions of the separator are such that there is turbulence and rapid flow of slurry which prevents settling of the suspended catalyst. Slurry leaves the lower end of the separator 23 through the outlet 55 which is connected to the discharge line 24 (Figs. 1 and 2). Hydrogen leaves the upper end of the separator 23 through the outlet 56 which is connected to the line 28 (Figs. 1 and 2).

As illustrated in Figure 2 the separator 23 is provided with a reflex type liquid level sight glass 57 the upper connection 58 communicating with the interior of the separator vessel above the normal slurry level and the lower connection 59 communicating with the interior of the separator vessel below the normal slurry level. Due to the fact that liquid in the separator 23 is a slurry, a conventional sight glass would not work because the suspended catalyst would settle out and block the lower connection 59 and also because the catalyst would deposit on the sight glass tube and render it opaque in a short time. The sight glass 57 is made practical in this device by bringing the solvent condensate, stripped from the hydrogen gas in the cooler 29 and separator 30, through the solvent return line 31 to the lower end of the sight glass and connecting the line 31 to the lower connection 59. By this means clear, condensed solvent (water or other sugar solvent) flows continuously into the separator and constitutes the indicating liquid in the sight glass 57. The glass 57 remains clear and gives a readily observable indication of the slurry level in the separator 23. The solvent has a lower specific gravity than the slurry and therefore the liquid level in the sight glass 57 is always proportionately higher than the slurry level in the separator 23.

The operation of the slurry discharge valve 26 is automatically controlled by conventional means, linking the float 53 through a float position responsive pneumatic controller 60 to the pneumatically operated diaphragm valve motor 61 and valve positioner 62. The valve motor 61 and positioner 62 are likewise conventional items of manufacture. Other types of automatic devices for operating the valve 26 can obviously be employed.

The successful operation of the float 53 in the slurry is due to the construction of the separator which maintains the catalyst suspended and provides a homogeneous flowing body of slurry.

To provide protection for the hydrogen circulating system against the possibility of failure of the valve 26 to discharge slurry a second float 54 is positioned in the separator 23 above the float 53 so that a rising level of slurry will raise the float 54. A second float position responsive pneumatic controller 63 is operatively connected to the float 54 so that if the latter is raised by the slurry a pneumatically actuated switch 64 is operated. The switch 64 can sound an audible alarm and/or stop the circulating compressor 33 and the slurry feed pump 15.

In the operation of the continuous separator of the invention the reaction mixture is allowed to enter the separator 23 through the nozzle 50. The gaseous hydrogen fraction of the mixture is returned to the circulating system after being stripped of entrained sugar solvent in the gas cooler 29 and separator 30. The slurry fraction of the mixture falls to the slurry receiving lower portion of the separator 23. As the liquid level rises the float 53 is raised and when it reaches a predetermined level the controller 60 actuates the valve operating motor 61 and valve positioner 62 to open the discharge valve 26. The valve 26 is thereafter opened or closed as required by the setting of the controller 60 in response to the position of the float 53 and hence the level of the slurry. This arrangement provides for maximum efficiency of the separator, for preventing pressure changes within the hydrogenating autoclaves, and protects the hydrogen circulating system from contamination with slurry.

It will be apparent that the apparatus described herein and claimed hereafter is adapted for use in other systems and that many modifications can be made without departing from the invention.

What is claimed is:

1. A device for continuously separating a gas and a slurry of suspended solids in liquids from a mixture thereof, comprising a vertically disposed separator having in its upper portion an inlet for the mixture to be separated and further having a gas outlet above said inlet and a slurry outlet in the lower portion of the separator, a condenser connected to the said gas outlet to condense vapor picked up by the gas from said slurry, a liquid level sight glass disposed outside of said separator and having a lower connection communicating with the lower portion of the separator and an upper connection communicating with the upper portion of the separator, and a liquid conduit connecting the said liquid condenser and the said lower connection of the liquid level sight glass whereby to return condensed liquid to the slurry and to provide a supply of clear condensed liquid to the said sight glass to function as a visible indicator of the level of slurry in the said separator.

2. A device for continuously separating liquid and gas at high pressure comprising a vertically disposed separator having a horizontal cross section which is small relative to its capacity, said separator having an inlet disposed substantially tangentially in the upper portion of the separator, said separator having a liquid outlet in its lower portion and a gas outlet in its upper portion above said inlet, a liquid condenser connected to said gas outlet, a liquid level sight glass disposed outside of the said separator and having a lower connection communicating with the lower portion of the separator and an upper connection communicating with the upper portion of the separator, a liquid conduit connecting the said liquid condenser and the lower connection of said sight glass to carry condensed liquid into the sight glass, and a valved liquid discharge conduit connected to the liquid outlet of said separator.

LEO KASEHAGEN.

References Cited in the file of this patent

UNITED STATES PATENTS

| Number | Name | Date |
|---|---|---|
| 1,499,710 | Weisgerber | July 1, 1924 |
| 1,619,919 | Cook | Mar. 8, 1927 |
| 1,834,180 | Raymond | Dec. 1, 1931 |
| 2,353,833 | Kimmell | July 18, 1944 |
| 2,419,275 | Metzgar | Apr. 22, 1947 |
| 2,419,300 | Tollefson | Apr. 22, 1947 |
| 2,421,451 | Balcar | June 3, 1947 |

OTHER REFERENCES

Publication: Chem. Eng. Catalogue, 1942–43; page 661.